United States Patent [19]
Konen

[11] 3,847,197
[45] Nov. 12, 1974

[54] TIRE BEAD DEMOUNTING APPARATUS
[75] Inventor: Ivan P. Konen, Fort Benton, Mont.
[73] Assignee: Konen, Inc., Fort Benton, Mont.
[22] Filed: Apr. 16, 1973
[21] Appl. No.: 351,149

[52] U.S. Cl. .............................................. 157/1.17
[51] Int. Cl. .......................................... B60c 25/06
[58] Field of Search .................................... 157/1.17

[56] References Cited
UNITED STATES PATENTS
2,679,896  6/1954  Branick .............................. 157/1.17
2,901,029  8/1959  Mraz .................................. 157/1.17

*Primary Examiner*—Al Lawrence Smith
*Assistant Examiner*—Harold P. Smith, Jr.

[57] ABSTRACT

A tire bead demounting apparatus for removal of a tire bead from a tire rim. The apparatus has a jaw assembly including upper jaw members and lower jaw members movable toward each other upon actuation of first power means to close the jaw assembly and embrace the tire rim. The upper jaw members have wedges which lodge between the tire bead and a portion of the tire rim, and locate a plunger assembly in proximity to the tire side wall. Upon actuation of second power means a plunger head extends outwardly from the plunger assembly to separate the tire side wall and tire bead from the rim.

8 Claims, 9 Drawing Figures

TIRE BEAD DEMOUNTING APPARATUS

BACKGROUND OF THE INVENTION

In the field of servicing of tires for heavy equipment, such as farm or construction equipment, specialized tools are necessary for use in removing the tire from a tire rim. Such tires have, on either side, an internal, annular bead which engages an annular, radially outwardy turned flange on the tire rim to seal and securely hold the tire in place. Disengaging or "breaking" the bead from the tire rim requires a considerable amount of force. Machines are available which are relatively large and expensive, and which employ hydraulically operated arms, levers, and the like, for example, the Model 948 truck tire demounter marketed by the Bishman Division of Royal Industries of Osseo, Minn. Such units are not as readily portable as is desirable. Smaller units are available which are readily portable but are not as effective as larger machines. Such smaller units may be manually operable, by means of screw jacks or the like, or may be powered by means such as pneumatic or hydraulic power units. Use of these smaller units is more time consuming, particularly the manually operated units.

Ther is a need for a small and portable tire bead demounting apparatus which can be used by service men in the field, and which quickly and effectively disengages tires from tire rims.

SUMMARY OF THE INVENTION

The invention relates to a tire bead demounting apparatus for removal of a tire from a tire rim. The apparatus has jaw means comprising a pair of upper jaw members aligned with and movably associated with a pair of opposed lower jaw members. The upper jaw members have flat forward surfaces terminating in downwardly directed teeth having tips directed toward the lower jaw members. Power means are operable to close the jaw by moving the forward ends of the upper jaw members and the lower jaw members toward one another to embrace a portion of a tire rim between the upper and lower jaw members. The teeth of the upper jaw members are adapted to be lodged or wedged between the side wall of a tire and the radially outwardly turned flange of the tire rim upon closure of the jaw.

A plunger assembly is movable with the upper jaw members upon closure of the jaw. The plunger assembly has a plunger head with a flat forward surface normally in general alignment with the flat forward surfaces of the upper jaw members. Upon closure of the jaw on a tire rim, the plunger head is positioned adjacent the tire side wall. The plunger is extendible outward from the upper jaw members when the jaw teeth are wedged between a tire side wall and a rim flange, whereby the plunger head exerts a perpendicular force on the tire side wall to push the side wall and tire bead away from the rim allowing the tire to be disengaged from the rim. Power means are operable to actuate the plunger. In a preferred embodiment, a first or jaw hydraulic motor of the cylinder-piston type is operable to close the jaw members, and a second or plunger hydraulic motor is operable to actuate the plunger. A single valve actuates both hydraulic motors whereby the apparatus is usuable in one continuous motion to disengage a tire.

An object of the invention is to provide a portable tire bead demounting apparatus operable to quickly and effectively disengage a tire from a tire rim. A second object of the invention is to provide such an apparatus having a plunger assembly and a jaw means adapted to engage a tire rim and position the plunger assembly in proximity to the tire side wall to separate the tire side wall and tire bead from the tire rim upon actuation of the plunger assembly. A further object of the invention is to provide such an apparatus having power means to actuate the jaw means and plunger assembly. A further object of the invention is to provide such an apparatus having a valve means adapted to sequentially actuate the power means for the jaw means and the power means for the plunger assembly. Further objects of the invention will become apparent upon the following description.

IN THE DRAWINGS

DESCRIPTION OF PREFERRED EMBODIMENTS

Figure 1:
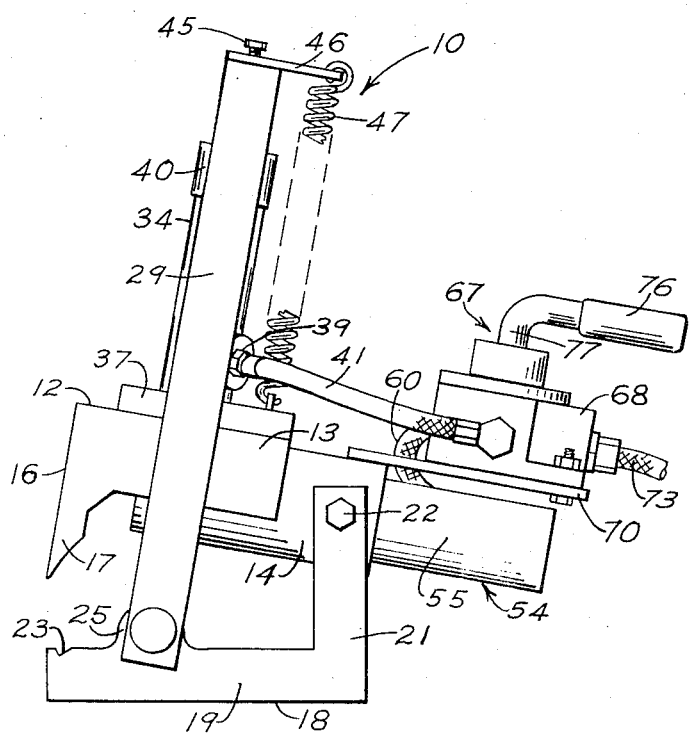
FIG. 1 is a side elevational view of the tire bead demounting apparatus of the invention having the jaw means in an open position.
Figure 2:
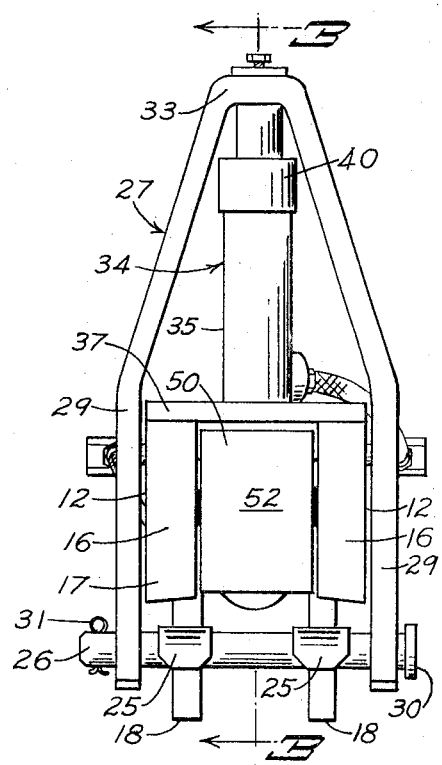
FIG. 2 is a front elevational view of the tire bead demounting apparatus shown in FIG. 1.

Referring to the drawings, there is shown in FIG. 1 a tire bead demounting apparatus of the invention, indicated generally at 10. Demounting apparatus 10 includes a clamping or jaw assembly for clamping onto a conventional tire rim and locating a bead breaking or plunger assembly in proper position to disengage, upon actuation, the tire side wall and bead from the tire rim. The jaw assembly includes a first jaw consisting of a pair of first or upper jaw members 12 each having a rearwardly extending portion 13 secured, as by welding or the like, to either side of a cylindrical housing 14. Each upper jaw member 12 has a flat front surface or plane working face 16, which, as shown in FIGS. 1 and 2, is generally horizontal but slightly inclined when the jaw assembly is in the open position. Forward surfaces 16 extend downward and terminate in outboard or free ends defining wedges or teeth 17.

Pivotally aligned and associated with the first jaw is a second jaw consisting of a pair of second or lower jaw members 18, each having a base leg 19 and an arm 21 extending upward from, and in perpendicular relation to, the inboard end of base leg 19. The upper end of arm 21 is pivotally connected to housing 14 by suitable means such as a pivot pin 22. The outboard or forward end of the base leg 19 is provided with a detent 23. The apex of each of the teeth 17 of upper jaw members 12 is directed toward the outboard end of a corresponding lower jaw member 18, as shown in FIG. 1.

An upwardly extended boss 25 is intermediately located on the base leg 19 of each lower jaw member 18. The bosses 25 are provided with mutually aligned holes to receive a cylindrical bar 26. A frame member or arcuate yoke 27 has a pair of legs 29, 29 which laterally straddle the jaw assembly and are provided at the lower ends thereof with appropriate holes to engage the ends of the bar 26. Bar 26 is held in position by suitable means as an end cap 30 at one end, and a cotter pin 31 at the opposite end. Legs 29, 29 of yoke 27 extend upwardly, straddling the jaw assembly, and are joined to each other by means of a shoulder 33 at the top of yoke 27.

Figure 3:
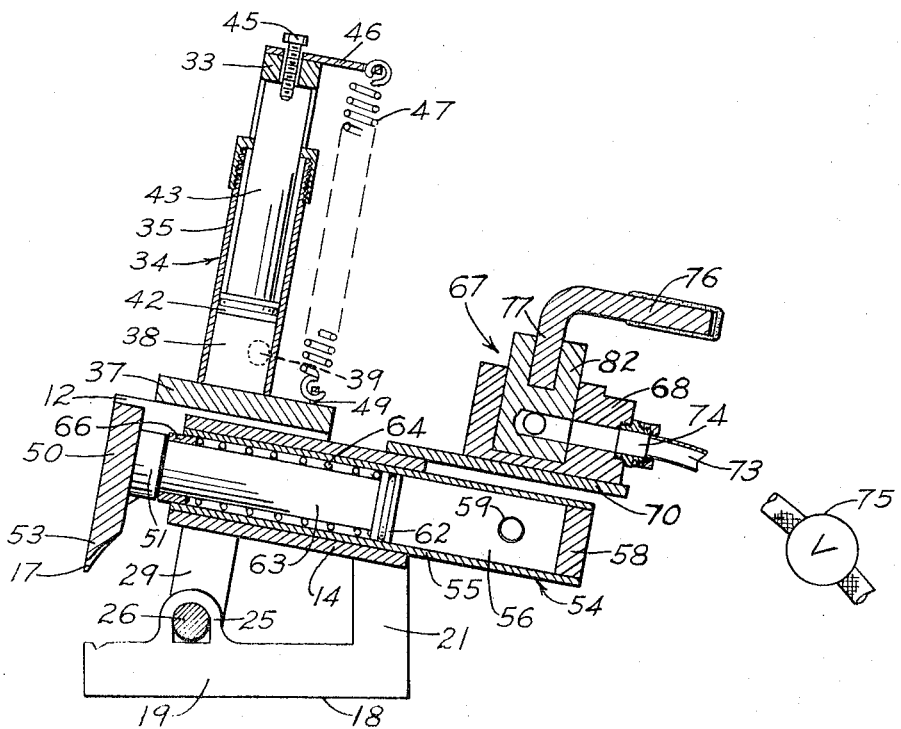
FIG. 3 is a sectional view of the tire bead demounting apparatus taken along the line 3—3 of FIG. 2.
Figure 4:
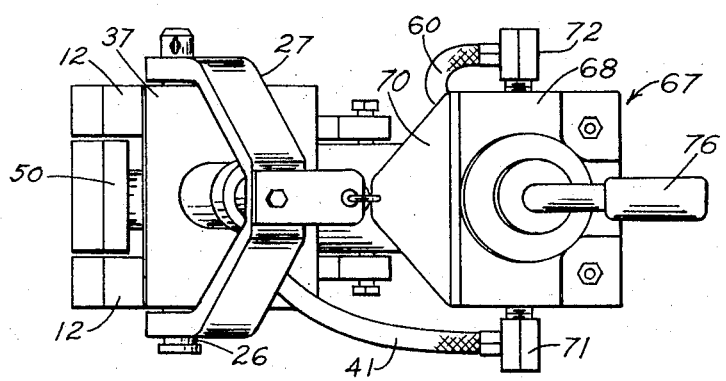
FIG. 4 is a top plan view of the tire bead demounting apparatus shown in FIGS. 1 and 2.

Closure of the jaw assembly by pivoting the first and second jaw members toward one another is effected by power means constituted as a first power unit or jaw assembly hydraulic motor 34 of the type having a cylinder portion and a piston-rod portion. Hydraulic motor 34 includes a cylinder 35 mounted to and extending upward from a plate 37 secured to the top surfaces of the upper jaw members 12 and extending over the housing 14. Cylinder 35, as shown in FIG. 3, defines a chamber 38 for receipt of a hydraulic fluid through a suitable inlet 39. A threaded end cap 40 closes the open end of chamber 38 around piston rod 43. Inlet 39 is connected by a hose 41 to a valve means 67, as will be more fully described, to control the hydraulic fluid supply. A longitudinally movable piston 42 is located in chamber 38 in sealing relationship to the side walls thereof by the use of suitable rings or the like. The piston rod 43 connected at one end to piston 42 extends longitudinally through the chamber 38 and outward at the top opening of cylinder 35, being connected by appropriate means such as a bolt 45 to the shoulder 33 of yoke 27.

Bias means are provided to bias the jaw assembly in the open position. Fastened to the upper surface of shoulder 33 by the bolt 45 is a clip 46 extending laterally outward and securing one end of a tension spring 47. Tension spring 47 is disposed parallel to hydraulic motor 34, being connected at the opposite end to an eye 49 secured in plate 37, and serves to bias the piston 42 inwardly of chamber 38. It may be seen that the jaw assembly is closed upon the introduction of hydraulic fluid under pressure through the inlet 39 to the chamber 38. As the piston 42 and piston rod 43 are held stationary by the yoke 27, cylinder 35 is forced downward relative to the piston 42, bearing on the plate 37. Upper jaw members 12 and housing 14 are caused to pivot about the pivot pins 22 toward the lower jaw members 18, closing the jaw assembly. Yoke 27 pivots about the bar 26 to a vertical orientation. Upon closure, the jaw assembly is adapted to engage a portion of a tire rim adjacent the tire side wall as will be more fully described. Upon release of the hydraulic pressure from the chamber 38, tension spring 47 is operable to open the jaw assembly by biasing the piston 42 inwardly of the chamber 38.

A bead breaking or plunger assembly is operable, when the jaw assembly is closed, to disengage the tire side wall and bead from the tire rim. A plunger head 50 connected to a plunger neck 51 is located between the upper jaw members 12 and has a flat front surface or plane working face 52 normally in substantial alignment with the front surfaces 16 of the upper jaw members. This front surface 52 terminates in a wedge or tooth 53 having a lower edge, as shown in FIG. 2, located at a slightly higher elevation than the lower edges of the teeth 17 of upper jaw members 12. Power means are operable to extend the plunger head 50 outward from the upper jaw members 12 whereby, when the jaw assembly is closed and engaging a tire rim, plunger head 50 will engage the tire side wall and exert a perpendicular force on it to move it away from the rim. This power means includes a second power unit or plunger hydraulic motor 54 having a cylinder 55 defining a chamber 56 closed at the rearward end by a plug 58. Chamber 56 is adapted to receive hydraulic fluid under pressure through an inlet 59 connected to the valve means 67 by a suitable hose 60. A longitudinally movable piston 62 is located in the chamber 56 in sealing relationship to the side walls thereof as by use of a suitable piston ring or the like. A piston or plunger rod 63 connected to the piston 62 extends longitudinally forward in the chamber 56, being connected at the opposite end to the plunger neck 51.

Bias means maintain plunger head 50 normally in alignment with the upper jaw members 12. A helical compression spring 64 is coiled about plunger rod 63 in chamber 56 exerting force at one end on the piston 62 and at the opposite end on annular bearing 66 interiorly circumscribed about the open forward end of the chamber 56 to normally maintain the front surface 52 of plunger head 50 in substantial alignment with the front surfaces 16 of the upper jaw members 12. It may be seen that the introduction of hydraulic fluid under pressure into the chamber 56 through inlet 59 forces the plunger head 50 outward against the bias of the spring 53. Upon release of the hydraulic fluid pressure, the spring 64 returns the plunger head 50 to the normal position.

Figure 5:
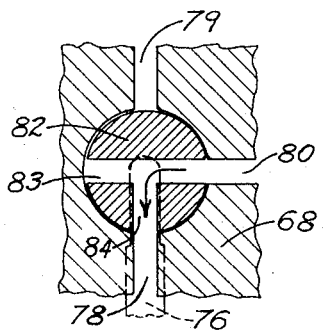
FIG. 5 is a schematic sectional view of a valve means of the invention shown in position to actuate a power unit controlling closure of the jaw means.
Figure 6:
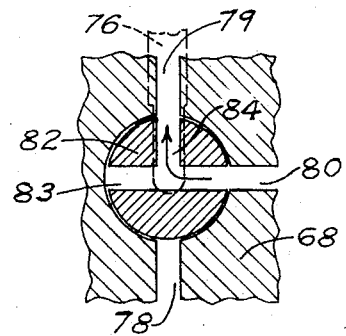
FIG. 6 is a schematic view of the valve means of FIG. 5 shown in position to actuate a power unit controlling extension of the plunger means.

In FIGS. 5 and 6 there is schematically illustrated one embodiment of a valve for use in the valve means, indicated generally at 67, although it is apparent that numerous suitable valve types are available which could be used in substitution.

This valve means 67 is operable to selectively activate and maintain hydraulic pressure in the first or jaw hydraulic motor and the second or plunger hydraulic motor. A valve casing 68 is mounted on a valve mounting plate 70 secured by conventional means as nuts and bolts as shown in FIG. 1. Mounting plate 70 is attached to housing 14 by suitable means, as welding. The hydraulic fluid hoses 41, 60 communicate with the interior of valve 67 by usual fixtures 71, 72, respectively. A hydraulic fluid supply line 73 delivers hydraulic fluid under pressure from a suitable remote source (not shown), communicating with valve 67 through a fixture 74. Control of the hydraulic fluid supply from the remote source is achieved by a remote valve, indicated at 75 in FIG. 3. Remote valve 75 may be constituted as, for example, a foot pedal, allowing passage of hydraulic fluid under pressure when actuated, and allowing return of hydraulic fluid to the reservoir when released. Valve control means constituted as a valve handle 76 connected to a valve stem 77 is operable to control flow of hydraulic fluid under pressure to either of the hydraulic motors from valve means 67.

Referring to FIGS. 5 and 6, valve casing 68 is provided with a plurality of fluid passages including a first outlet passage 78 communicating with the jaw hydraulic motor 34 through fixture 71 and hose 41; a second outlet passage 79 in alignment with the first outlet passage 78 and communicating with the plunger hydraulic motor 54 through fixture 72 and hose 60; and an inlet passage 80 perpendicularly disposed to the first and second outlet passages 78, 79, and communicating with the hydraulic fluid supply source through supply line 73 and fixture 74. The various passages converge to a cylindrical opening in casing 68 where there is provided a rotatable valving element 82 connected to the valve stem 77 and rotatable with the handle 76. Valving element 82 is provided with a T-shaped passage having a first leg 83 passing centrally through element 82, and a second leg 84 perpendicular to the first leg 83 and extending therefrom to the periphery of element 82. Manual manipulation of valve handle 76 allows valve element 82 to successively be orientated in the configuration shown in FIG. 5, allowing passage of hydraulic fluid from inlet passage 80 through first outlet passage 78 to actuate the jaw hydraulic motor; to the orientation shown in FIG. 6 allowing passage of hydraulic fluid from the inlet passage 80 through the second outlet passage 79 to actuate the plunger hydraulic motor; and to a third orientation (not shown) allowing communication of both the first and second fluid passages 78, 79 with the inlet passage 80 for release of hydraulic pressure from both hydraulic motors through the inlet passage 80 when remote valve 75 is released.

Figure 7:
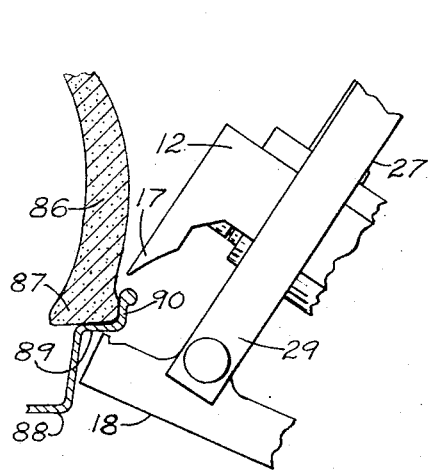
FIG. 7 is a fragmentary view showing a portion of the tire demounting apparatus in operative proximity to a tire mounted on a rim.
Figure 8:
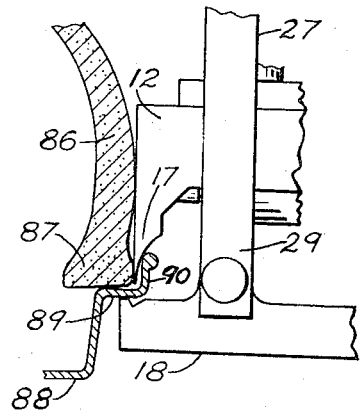
FIG. 8 is a fragmentary view of the apparatus of FIG. 7 showing a portion of the tire demounting apparatus in engagement with a tire rim in proximity to the side wall and bead of a tire.
Figure 9:
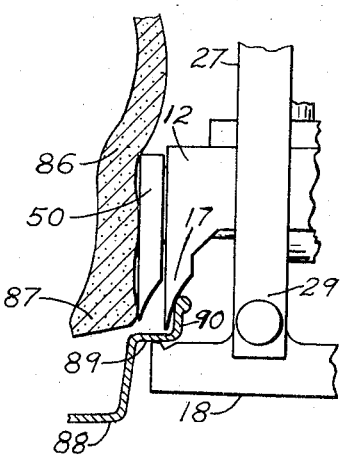
FIG. 9 is another fragmentary view of the apparatus of FIG. 7 but showing a portion of the tire demounting apparatus operative to disengage the bead and side wall of a tire from a tire rim.

The operation of the tire bead demounting apparatus 10 is best shown in FIGS. 7 through 9. A tire having a side wall 86 and a bead 87 is mounted in a tire rim 88. Tire rim 88 is of the conventional type having an angular tire retaining section including an outwardly extended ledge 89 terminating in a perpendicular, radially extended peripheral flange 90. The recess defined between the ledge 89 and the flange 90 defines an interior tire retaining surface which accommodates the bead 87 of the tire. The tire demounting apparatus 10 is brought into operative proximity to the tire, as shown in FIG. 7, the teeth 17 of the upper jaw members 12 being rotated adjacent the interface of the tire bead 87 and rim flange 90. With remote valve 75 actuated to provide hydraulic fluid under pressure, the handle 76 of valve means 67 is rotated in the appropriate orientation to actuate the jaw closure hydraulic motor 34, which functions to close the jaw assembly, as previously described. The jaw teeth 17 wedge or lodge between the tire bead 87 and the rim flange 90, while the lower jaw members 18 bear against the exterior surface or ledge 89, as shown in FIG. 8. Plunger head 50, disposed between upper jaw members 12, is likewise wedged between the rim flange 90 and tire bead 87. The wedge configuration of the upper jaw members 12 slightly displaces the tire bead relative to flange 90. The operation continues to rotate the valve handle 76 until the valve orientation is reached, as shown in FIG. 6, which actuates the plunger hydraulic motor 54 while maintaining hydraulic pressure on the jaw closure hydraulic motor. Plunger head 50 is moved outward from the upper jaw members 12 and forces the tire side wall 86 and bead 87 inward and out of engagement with the rim 88, as shown in FIG. 9, thus accomplishing the purpose of the invention. An appropriate tool or bar or the like is then inserted by the operator between the tire bead 87 and the rim 88 to maintain the tire disengaged from the rim. The operation is then repeated around the tire rim as many times as may be necessary to completely free the tire from the rim. Release of the jaw assembly from the tire is effected by moving the valve handle to an orientation whereby the second fluid passage 84 of valve element 82 is in alignment with inlet passage 80 of valve means 67. Upon release of fluid pressure from the remote hydraulic fluid source by release of remote valve 75, hydraulic fluid pressure in the hydraulic motors is released, allowing return of the upper jaw member and plunger head to their normal positions by means of the springs 47 and 64, as previously described.

The tire is quickly and easily removed from the rim. The operator manipulates the valve handle 76 in a relatively continuous motion between the first, second and release positions. The plunger head 50 is particularly effective as it applies a force perpendicular to the side wall 86 of the tire to disengage it from the rim, rather than applying an inclined force as certain devices in the prior art.

The embodiments of the invention in which an exclusive property or privilege is claimed are defined as follows:

1. A tire bead demounting apparatus for use in connection with a tire rim having an angular tire retaining section with an interior tire bead bearing surface and an opposite exterior surface, and a tire installed on said rim having a side wall terminating in a bead situated adjacent and in sealing relationship to said interior surface, said apparatus including:

a jaw assembly having a first jaw and a second jaw opposed to and movably connected to the first jaw for movement between an open position wherein said first and second jaws are spaced apart from each other, and a closed position wherein said first and second jaws are relatively closer to each other;

a yoke pivotally connected to the second jaw;

a first hydraulic motor of the type having a cylinder portion and a piston-rod portion movable inwardly and outwardly relative to the cylinder portion to move said jaws from said open position toward said closed position;

one portion of said first hydraulic motor being connected to said yoke, the other portion of said first hydraulic motor being connected to the first jaw whereby upon actuation of the first hydraulic motor the piston-rod portion moves outwardly of the cylinder portion to move the jaws toward the closed position;

said second jaw having a configuration adapted to bear against the exterior surface of the tire retaining section of the tire rim;

said first jaw having a wedge configuration adapted to be lodged between and relatively displace said bead and said interior surface of the tire retaining section of the tire rim when the second jaw is bearing against the exterior surface and said first power means is actuated to move the jaws toward said closed position;

plunger means having a plunger head in alignment with the first jaw and movable with the first jaw toward said closed position;

said plunger head being extendible outward from the first jaw toward the tire side wall when the wedge configuration of the first jaw is lodged between said bead and said interior surface of the tire retaining section of the tire rim;

a second hydraulic motor of the type having a cylinder portion and a piston-rod portion movable inwardly and outwardly relative to the cylinder portion, one portion of said second hydraulic motor being connected to the first jaw, the other portion of said second hydraulic motor being connected to the plunger means whereby upon actuation of the second hydraulic motor the piston-rod portion is moved outwardly of the cylinder portion to extend said plunger head outward against said tire side wall when the wedge configuration of the first jaw is lodged between said bead and said interior surface;

valve means operably connected to the first hydraulic motor and the second hydraulic motor for independent actuation of each hydraulic motor;

said valve means having control means successively movable between a first position to actuate the first hydraulic motor, a second position to actuate the second hydraulic motor, and a third position to release both the first and second hydraulic motors.

2. The tire bead demounting apparatus of claim 1 including: bias means associated with the first hydraulic motor biasing the piston-rod portion inwardly of the cylinder portion.

3. The tire bead demounting apparatus of claim 1 including: bias means normally biasing the piston-rod portion of the second hydraulic motor inwardly of the cylinder portion.

4. A tire bead demounting apparatus for disengaging a tire side wall and bead from a tire rim of the type having an outwardly extended ledge and a radial flange extended from said ledge, said ledge and flange engaging the tire bead, said apparatus including:

a jaw assembly having a first pair of jaw members and a second pair of jaw members pivotally connected to the first pair of jaw members;

said first jaw members and said second jaw members being pivotally movable between an open position wherein the jaw assembly is open and a closed position wherein the jaw assembly is closed;

first power means operable to close the jaw assembly constituted as a first hydraulic motor of the type having a cylinder portion and a piston-rod portion movable inwardly and outwardly of the cylinder portion;

a yoke pivotally connected to the second jaw members;

one portion of said first hydraulic motor being connected to said yoke; the other portion of said first hydraulic motor being connected to said first jaw members whereby the jaw assembly is closed when said first hydraulic motor is actuated to move the piston-rod portion outwardly of the cylinder portion;

said first jaw members having flat forward surfaces terminating in wedges directed toward the second jaw members adapted to lodge between and relatively displace said bead and said radially extended flange of said tire rim upon closure of the jaw assembly with said second jaw members bearing against said ledge whereby the first and second jaw members embrace the flange and ledge;

plunger means associated with the first pair of jaw members including a plunger head located between said first jaw members having a flat forward surface normally in substantial alignment with the forward surfaces of the first pair of jaw members and extendible outward therefrom toward the tire side wall when the wedges of the first jaw members are lodged between the bead and the radially extended flange of the tire rim to exert a perpendicular force against the tire side wall and disengage it from the tire rim;

second power means operable to outwardly extend said plunger head, constituted as a second hydraulic motor of the type having a cylinder portion and a piston-rod portion movable inwardly and outwardly of the cylinder portion;

one portion of the second hydraulic motor being connected to the plunger head; the other portion of said second hydraulic motor being connected to the first pair of jaw members whereby upon actuation of the second hydraulic motor to move the piston-rod portion outwardly of the cylinder portion, the plunger head is outwardly extended from the first jaw members;

valve means operably connected to the first and second hydraulic motors for independent actuation thereof and adapted to receive hydraulic fluid under pressure from a remote hydraulic fluid source; and valve control means located on the valve means for controlling said valve means and sequentially movable between a first position actuating the first hydraulic motor and a second position actuating the second hydraulic motor and a third position to release both hydraulic motors.

5. A tire bead demounting apparatus for use in connection with a tire rim having an outwardly extended ledge and a radial flange extending from said ledge, and a tire installed on said rim and having a side wall and a bead terminating said side wall and situated adjacent said ledge and in sealing relation to said flange; said apparatus including:

a jaw assembly including at least one first jaw member having a working face and at least one second jaw member in opposed relation to and movably connected to the first jaw member for movement between an open position wherein said members are spaced from each other and a closed position wherein said members are relatively closer to each other;

first power means to move said members from said open position toward said closed position;

a frame member pivotally connected to the second jaw member, said first power means including a hydraulic motor of the type having a cylinder portion and a piston-rod portion movable inwardly and outwardly relative to the cylinder portion; one portion of the first hydraulic motor being connected to said frame member, the other portion of said hydraulic motor being connected to the first jaw member whereby upon actuation of the first hydraulic motor the piston-rod portion moves outwardly of the cylinder portion to move the jaw members toward the closed position;

plunger means movable with said first member and including a plunger head having a working face normally located adjacent and substantially in the same plane as the working face of said first jaw member, said plunger means being also movable from a first position wherein said plunger working face is in said normal position to a second position wherein said plunger working face extends outwardly from the plane of said first jaw member working face;

second power means to move said plunger means from said first position toward said second position;

said second power means including a second hydraulic motor of the type having a cylinder portion and a piston-rod portion movable inwardly and outwardly of the cylinder portion; one portion of the second hydraulic motor being connected to the first jaw member; the other portion of the second hydraulic motor being connected to the plunger means whereby upon actuation of the second hydraulic motor the piston rod portion is moved outwardly of the cylinder portion and the plunger head is extended outward from said first position toward said second position;

said first jaw member being of configuration to attain position between said tire wall and bead on the one hand and said radial flange on the other when said jaw member working face is positioned against said tire wall and said second jaw member is situated in contact with said ledge;

said second jaw member being of configuration to attain a bearing relation to said ledge when said working face of said first jaw member is in contact with said tire wall;

valve means operably connected to the first and second hydraulic motors for independent actuation thereof and adapted to receive hydraulic fluid under pressure from a remote hydraulic fluid source; and valve control means located on the valve means for controlling said valve means, sequentially movable between a first position actuating the first hydraulic motor and a second position actuating the second hydraulic motor, and a third position to release both hydraulic motors.

6. The tire bead demounting apparatus of claim 5 wherein: said jaw assembly has a pair of first jaw members and a pair of second jaw members; said plunger head being located between the first jaw members.

7. The tire bead demounting apparatus of claim 5 including: bias means associated with the first hydraulic motor biasing the piston-rod portion inwardly of the cylinder portion.

8. The tire bead demounting apparatus of claim 5 including: bias means normally biasing the piston-rod portion of the second hydraulic motor inwardly of the cylinder portion.

* * * * *